United States Patent
Peterson

(10) Patent No.: US 6,240,338 B1
(45) Date of Patent: May 29, 2001

(54) SEED ROM FOR RECIPROCAL COMPUTATION

(75) Inventor: James R. Peterson, Portland, OR (US)

(73) Assignee: Micron Technology, Inc., Boise, ID (US)

(*) Notice: Subject to any disclaimer, the term of this patent is extended or adjusted under 35 U.S.C. 154(b) by 832 days.

(21) Appl. No.: 08/517,902

(22) Filed: Aug. 22, 1995

(51) Int. Cl.⁷ ........................................ G06F 7/50
(52) U.S. Cl. .................. 700/654; 700/650; 700/656; 700/620; 700/670; 712/221; 712/223
(58) Field of Search .................. 708/607, 620, 708/622, 625, 650, 495, 654, 656, 670, 673; 712/221–223

(56) References Cited

U.S. PATENT DOCUMENTS

| | | | |
|---|---|---|---|
| 4,413,326 | * 11/1983 | Wilson et al. | 364/748 |
| 5,012,438 | * 4/1991 | Yamaguchi | 364/765 |
| 5,068,816 | * 11/1991 | Noetzel | 364/718 |
| 5,079,716 | * 1/1992 | Lenhardt et al. | 364/483 |
| 5,157,624 | * 10/1992 | Hesson | 364/748 |
| 5,220,524 | * 6/1993 | Hesson | 364/748 |
| 5,249,149 | * 9/1993 | Cocanougher et al. | 364/748 |
| 5,305,248 | * 4/1994 | Ammann | 364/748 |
| 5,341,321 | * 8/1994 | Krap et al. | 364/748 |
| 5,499,272 | * 3/1996 | Bottomley | 375/347 |

\* cited by examiner

*Primary Examiner*—William Grant
*Assistant Examiner*—Ramesh Patel
(74) *Attorney, Agent, or Firm*—Dorsey & Whitney LLP

(57) ABSTRACT

A method and apparatus for performing a divide operation in a computer are described. The apparatus includes a first memory containing estimated reciprocal terms, and a second memory containing reciprocal error terms. An adder adds a selected estimated reciprocal term from the first memory and a selected reciprocal error term from the second memory to provide the reciprocal. The selected estimated reciprocal term and the selected reciprocal error term correspond to at least a portion of a divisor. The apparatus includes a multiplier for multiplying a dividend by the reciprocal to generate a quotient. The method includes the step of looking up an estimated reciprocal term in a first lookup table stored in a first computer memory wherein the estimated reciprocal term corresponds to at least a portion of a given divisor. A reciprocal error term is looked up in a second lookup table stored in a second computer memory, the error term corresponds to at least a portion of the divisor. A reciprocal of the divisor is generated from the estimated reciprocal term and the error term. A dividend is multiplied by the reciprocal of the divisor to generate a quotient.

26 Claims, 2 Drawing Sheets

US 6,240,338 B1

SEED ROM FOR RECIPROCAL COMPUTATION

FIELD OF THE INVENTION

This pertains to the field of computers. In particular, this pertains to methods and apparatus for computing reciprocals and performing divide operations.

BACKGROUND OF THE INVENTION

Computers are well known for their ability to perform mathematical functions at a high rate of speed. In order to achieve such speed, computers use various techniques to perform mathematical functions on given operands. Limitations in the representation of numbers and in numerical calculations within the computer lead to computed results that are only accurate to within some known or estimated error term. The ability to perform basic functions such as addition, subtraction, multiplication, and division to a consistent accuracy in a timely manner is a consideration in computational performance of the computer system.

One technique for implementing a mathematical function is to implement the function in hardware. Math functions including addition and subtraction might be accomplished by performing the steps of 1) loading registers with the operands; 2) executing the operational code ("opcode") for the desired function; and then, 3) retrieving the result from one or more registers. The opcode is simply a command to perform the function implemented in hardware.

One disadvantage of this prior art technique is that some functions, such as division, typically require several cycles for completion which in turn tends to adversely affect system performance.

An alternative method of computing other results, such as reciprocals $$\left(\text{i.e., } f(x) = \frac{1}{x}\right),$$

often involves looking the result up in a table. For example, the steps for computing a reciprocal might include 1) scaling or normalizing an operand; 2) looking up a reciprocal value corresponding to the normalized value in a lookup "seed" table; and 3) scaling or denormalizing the looked up value to reflect the reciprocal of the denormalized operand. The lookup table is typically stored in a read only memory (ROM). The error associated with this technique is controlled to a great extent by the "height" and "width" or the precision of the entry in the lookup table.

One disadvantage of the conventional lookup approach is that the area required to store the lookup table on the integrated circuit may prevent the lookup approach from being a cost effective technique for given precision requirements.

A cost effective way of implementing mathematical functions such as reciprocal or division to within a consistent error margin in a given time frame is a desirable feature of a computer system.

SUMMARY AND OBJECTS OF THE INVENTION

Methods and apparatus for computing reciprocals and performing divide operations in a computer are described.

A reciprocal of an operand is determined by looking up an estimated reciprocal term in a first lookup table stored in a first computer memory wherein the estimated reciprocal term corresponds to at least a portion of the operand. An error term is looked up in a second lookup table stored in a second computer memory. The error term corresponds to at least a portion of the operand. The reciprocal is generated from the estimated reciprocal term and the error term.

A method of performing a divide operation in a computer includes the step of looking up an estimated reciprocal term in a first lookup table stored in a first computer memory. The estimated reciprocal term corresponds to at least a portion of a given divisor. A reciprocal error term is looked up in a second lookup table stored in a second computer memory. The reciprocal error term corresponds to at least a portion of the divisor. A reciprocal of the divisor is generated from the estimated reciprocal term and the error term. A dividend is multiplied by the reciprocal of the divisor to generate a quotient.

An apparatus for computing a reciprocal of an operand includes a first memory containing estimated reciprocal terms, and a second memory containing reciprocal error terms. The apparatus further includes an adder for adding a selected estimated reciprocal term from the first memory and a selected reciprocal error term from the second memory to provide the reciprocal, wherein the selected estimated reciprocal term and the selected reciprocal error term correspond to at least a portion of the operand.

An apparatus for performing a divide operation includes a first memory containing estimated reciprocal terms, and a second memory containing reciprocal error terms. The apparatus also includes an adder for adding a selected estimated reciprocal term from the first memory and a selected reciprocal error term from the second memory to provide the reciprocal. The selected estimated reciprocal term and the selected reciprocal error term correspond to at least a portion of a divisor. A multiplier multiplies a dividend by the reciprocal to generate a quotient.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

One method of accomplishing a division such as $f(x,y) = y/x$ is to take the reciprocal of x and multiply it by y. This requires an ability to multiply and means for determining the reciprocal of x. Hardware multipliers, however, tend to be more prevalent and complete an operation faster than hardware dividers.

Figure 1:
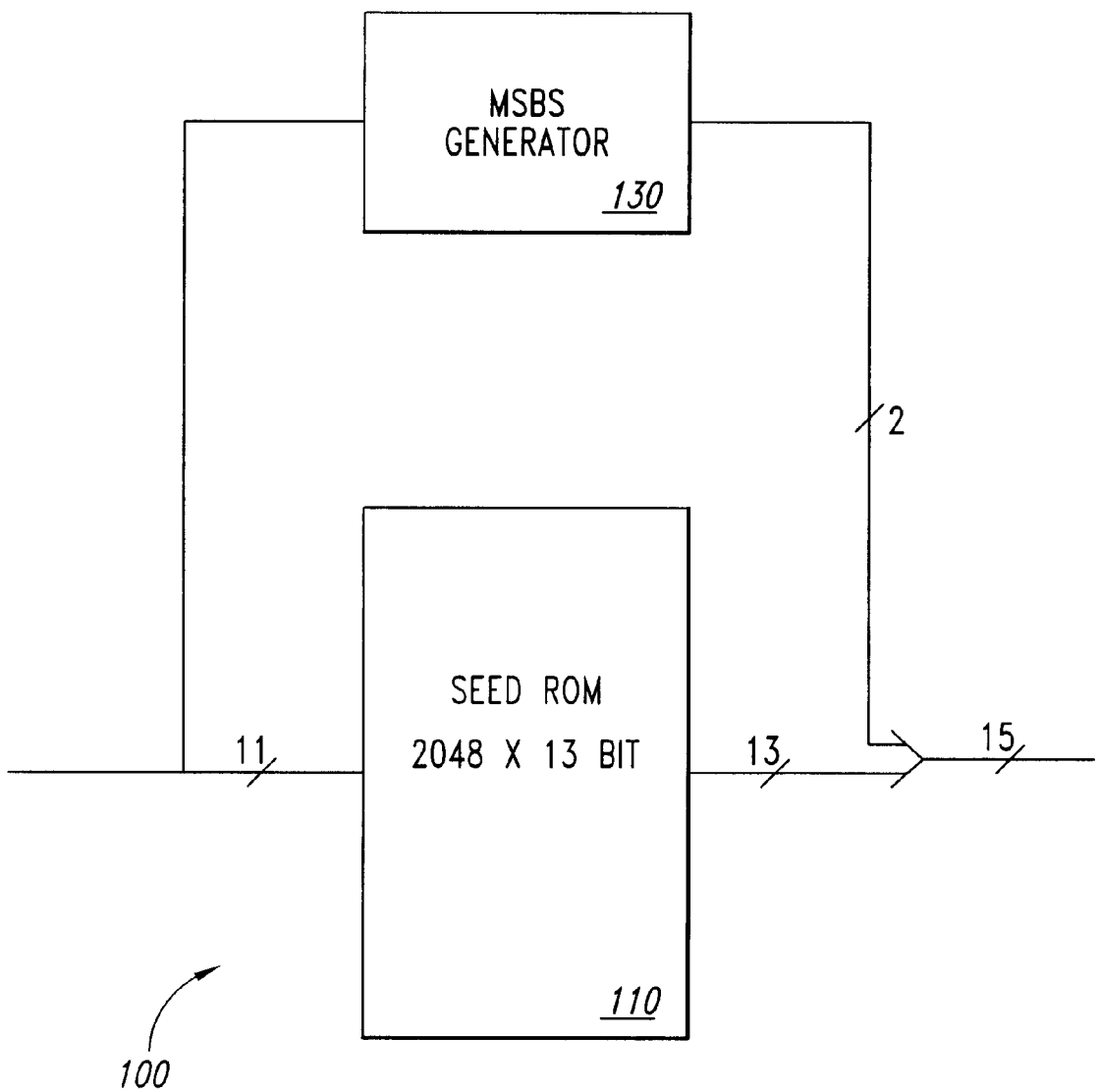
FIG. 1 illustrates prior art circuitry for computing a reciprocal.

FIG. 1 illustrates one embodiment of prior art circuitry for a lookup table implementation of a reciprocal function (e.g., $f(x)=1/x$). As shown, apparatus 100 generates a 15 bit reciprocal from an 11 bit input value. At least a portion of the 11 bit input value is used to lookup a value stored in read only memory (ROM) 110. ROM 110 may be referred to as a "seed" ROM. A portion of the 11 bit input value is used as an address or a lookup key to ROM 110. When read, the ROM returns a 13 bit lookup value associated with that lookup key or address. Another portion of the 11 bit operand is used to generate the 2 most significant bits of the result. The most significant bits (msbs) generator circuitry (130) is typically combinatorial logic. The 13 bits and the generated most significant 2 bits are then combined to provide the 15 bit reciprocal result which may be called the seed.

Although the normalization function is not illustrated in FIG. 1, typically, the input to the seed ROM is x' instead of x, where x represents the operand for which a reciprocal is to be determined and x' represents a normalized value for x. The seed (reciprocal result) may need to be scaled or denormalized in order to reflect the reciprocal of the operand x as opposed to x'.

One disadvantage of this technique is that the table, as implemented in read only memory, can take up a relatively large amount of silicon. In the embodiment illustrated, a 2048 by 13 bit ROM is necessary to calculate a 15 bit reciprocal that is within approximately $2^{-10.5}$ of the true or actual reciprocal.

Figure 2:
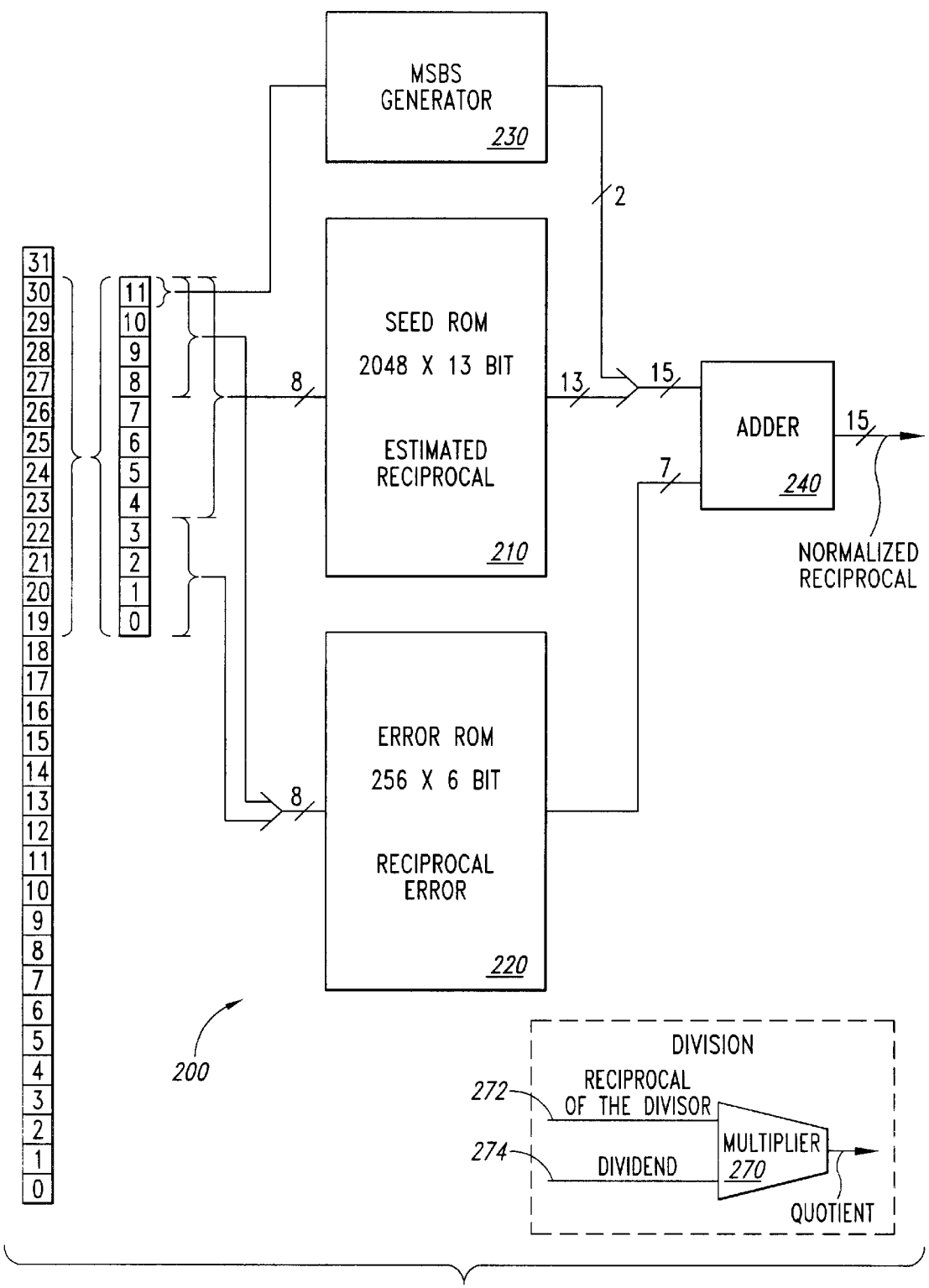
FIG. 2 illustrates circuitry for computing a reciprocal.

FIG. 2 illustrates one embodiment of a dual lookup table implementation that accomplishes the reciprocal function with the same precision and approximately the same accuracy as the circuitry of FIG. 1.

FIG. 2 illustrates circuitry for determining the reciprocal of a 12 bit normalized operand. The result is a 15 bit normalized reciprocal result. First ROM 210 contains a lookup table of estimated reciprocal terms. Second ROM 220 contains a lookup table of reciprocal error terms. In an alternative embodiment, one ROM might be used instead of two. In other embodiments, one or both tables are realized in a logic gate implementation. The mechanism for storing the tables will be generally referred to as computer memory and can include nonvolatile memory such as read only memory or a logic gate implementation.

The most significant 8 bits of the 12 bit normalized operand are used by first ROM 210 to lookup an estimated reciprocal term. The most significant bit of the 12 bit operand are is used by msbs generator 230 to determine the 2 most significant bits of the estimated reciprocal term. The 4 least significant bits and the 4 most significant bits are used by second ROM 220 to lookup a reciprocal error term. In this embodiment the reciprocal error term is a 6 bit expression. Adder 240 adds the 6 bit reciprocal error term to the 15 bit estimated reciprocal term. The 6 bit reciprocal error term is aligned with the least significant 6 bits of the estimated reciprocal term for purposes of accomplishing the addition. The result is a 15 bit normalized reciprocal result.

Msbs generator 230 examines the most significant bit of the 12 bit normalized input value. If this most significant bit is a "1" then msbs generator 230 will output a "01". If this most significant bit is a "0" then msbs generator 230 will output a "10". Msbs generator 230 can be realized using combinatorial logic. The 2 bits generated become the 2 most significant bits of the 15 bit normalized reciprocal result.

One advantage of the circuitry of FIG. 2 is the difference in the size of the lookup tables. In this embodiment, the circuitry of FIG. 2 has the same number of bits of precision and approximately the same level of accuracy as the circuitry of FIG. 1. In order to achieve this level of accuracy a 2048×13 bit (26,624 bit) ROM was required in FIG. 1. The embodiment in FIG. 2, however, uses a 256×13 bit estimated reciprocal ROM and a 256×6 bit error ROM. This equates to a total of 256×(13+6), or 4864 bits of storage. Thus the lookup tables of FIG. 2 require considerably less storage than the lookup table in FIG. 1. This equates to a substantial savings in area required for implementation on an integrated circuit.

The embodiment shown in FIG. 2 utilizes unsigned integers. In other words, the entries in ROMs 210 and 220 are treated as positive numbers. Because the normalized reciprocal result is generated by adding the estimated reciprocal and error terms, the reciprocal will be approached from the lower side. In other words, the estimated reciprocal term is less than or equal to the actual reciprocal. The correct value is approximated by adding a positive error term to the estimated reciprocal term.

Although a 12 bit operand (normalized) is available to the estimate and error ROMs, only a portion of the 12 bits is used for addressing or looking up entries in estimated reciprocal and error lookup tables. This indicates that groups or ranges of normalized operands will share the same estimated reciprocal entry. In this embodiment, all 12 bit input normalized operands having the same 8 most significant bits will share the same estimated reciprocal table entry or "seed". This means that the least significant 4 bits play no role in selecting the seed, so 16 consecutive input values share the same seed value.

Groups or ranges of normalized operands will share the same error term because only a portion of the normalized operand's 12 bits is used for addressing or looking up entries in the error ROM. Because only 8 of the bits are used, all 12 bit normalized operands having the same 4 most significant bits and the same least significant 4 bits will share the same error term. Thus groups of 16 input values will share the same error term. Due to the address decoding structure, this also means that 16 consecutive entries in seed ROM 210 will be associated with the same error term.

Referring to FIG. 2, the data stored in the estimated reciprocal lookup table and in the reciprocal error lookup table is dependent to a great extent upon the normalization routine used.

In this embodiment 32 bit data word 250 is used for the input operand. The 32 bit data word has bit positions ranging from bit 0 to bit 31 where bit 31 represents the most significant bit position.

To normalize the input operand, the operand is left-shifted until bit position 31 contains a "1". In other words, the input operand is left-shifted until the most significant "1" bit of the original input operand is in bit position 31. Shifting is well known in the art and is not illustrated in FIG. 2. The result of 32 minus the bit position of the most significant "1" in the original operand is stored in a scale register and is referred to as the scale factor. This value is equivalent to the number of positions shifted plus one in this embodiment. Bits 30 to 19 are the normalized 12 bits (260) provided as an input to the reciprocal computation.

After the reciprocal has been calculated, the normalized reciprocal must be denormalized so that it corresponds to the reciprocal of the original input operand as opposed to the reciprocal of the normalized operand. This is accomplished by right-shifting the normalized reciprocal. The number of positions to right-shift depends upon the position of the radix point of the input operand and the scale factor. For example, if the input radix point is between bits 16 and 15, the reciprocal result is determined by right-shifting the normalized reciprocal by (scale factor−2) positions. The shifting circuitry is well known in the art and is not illustrated in FIG. 1. In other words, the normalized reciprocal result will be shifted m bit positions to the right, where m is determined from the scale factor and the location of the radix of the input operand.

The data stored in the estimated reciprocal lookup table is based upon this normalization scheme and the observation that 16 consecutive input operand values will share the same entry in the estimated reciprocal lookup table. To determine the estimated reciprocal lookup table entries, first the $2^{12}$ possible input operand values are treated as groups of 16 consecutive values. The input operand values within each group are treated as floating point numbers. Next the input operand values are inverted (i.e., actual reciprocals are computed). The 13 bit estimated reciprocal value is chosen as the value which is less than or equal to the smallest actual reciprocal result. This process is repeated for all $2^8$ groups.

The data stored in the reciprocal error lookup table is based upon the same normalization scheme. For each set of 16 consecutive seed ROM entries, an error term is calculated. The error term is determined by selecting the smallest error term such that the estimated reciprocal value plus the error term is less than or equal to the actual reciprocal corresponding to each of the 16 consecutive seed ROM entries.

Appendix 1 contains a listing of a program for generating lookup table data for the seed ROM and the error term ROM. Subroutine "main" is used to generate the estimated reciprocal table and to print out the results (if desired). Subroutine "main" also contains provisions to print out the error terms. The program was written in Gnu C++ for execution on a Sun Microsystems (Mountainview, Calif.) workstation using the Sun Solaris operating system.

Appendix 2 contains a listing of a program for emulating the hardware seed ROM. The data that would be placed into a ROM is loaded into an array. The program prints the seed value, scale factor, and the actual inverse for a series of input values.

Although a 32 bit data word has been used in examples presented above, other data word sizes can be used. Examples of common data word sizes include 8, 16, 32, 64, and 128 bit data words. As discussed above, the "height" and "width" of the tables control the precision and accuracy of the resulting computed reciprocal. For the 32 bit example presented above, only 12 bits were used for accessing the lookup tables. (Inherent in the table data, however, was the assumption of a 13th bit that had a value of "1"—in this case bit 31.) Only 8 bits were used to access the ROMs, and therefore only $2^8$ (i.e., 256) unique addresses could be looked up. For greater accuracy, more bits from the data word could be used. This would permit accessing larger (i.e., "longer" or "higher" data tables). In other words, the tables could have more entries in them. The number of bits (i.e., "width") for each entry in the tables can also be varied. A greater number of bits for each entry will increase the precision of the result. The tradeoff, however, is that a greater number of entries or an increase in the number of bits for each entry will require more storage space and therefore will require additional area on an integrated circuit.

Assuming that multipliers are available, a divide operation can be accomplished by multiplying the intended dividend by the reciprocal of the divisor, as calculated above. Referring to FIG. 2, the divisor is normalized. A normalized reciprocal is then calculated. The normalized reciprocal is denormalized by using the scale factor to generate the result. Another operand (i.e., divided 274), and the reciprocal (i.e., reciprocal of the dividend 272) are then sent to the hardware multiplier 270.

In the preceding detailed description, the invention is described with reference to specific exemplary embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. A method of computing a reciprocal of an operand comprising the steps of:

a) looking up an estimated reciprocal term in a first lookup table, wherein the estimated reciprocal term corresponds to at least a first portion of the operand;

b) looking up an error term in a second lookup table, wherein the error term corresponds to at least a second portion of the operand; and c) generating the reciprocal from the estimated reciprocal term and the error term.

2. The method of claim 1 wherein at least one of the first and second lookup tables is stored in a nonvolatile memory.

3. The method of claim 2 wherein the nonvolatile memory comprises read only memory.

4. The method of claim 2 wherein the nonvolatile memory comprises logic gates.

5. The method of claim 1 wherein the step of generating the reciprocal further comprises the step of adding the estimated reciprocal term and the error term.

6. The method of claim 1 wherein entries of the first lookup table are determined by the steps of:

1) computing an actual reciprocal for each operand value that shares a same first lookup table entry;

2) computing the first lookup table entry such that the first lookup table entry is less than or equal to all of the actual reciprocals; and 3) repeating steps 1) and 2) for each first lookup table entry.

7. The method of claim 1 wherein entries of the second lookup table are determined by the steps of:

1) computing an actual reciprocal for each operand value that shares a same second lookup table entry;

2) computing the second lookup table entry such that the second lookup table entry plus the estimated reciprocal term for any operand value sharing the same second lookup table entry is less than or equal to the actual reciprocal of that operand value; and 3) repeating steps 1) and 2) for each second lookup table entry.

8. A method of performing a divide operation in a computer comprising the steps of:

a) looking up an estimated reciprocal term in a first lookup table, wherein the estimated reciprocal term corresponds to at least a first portion of a given divisor;

b) looking up an error term in a second lookup table, wherein the error term corresponds to at least a second portion of the divisor;

c) generating a reciprocal of the divisor from the estimated reciprocal term and the error term; and d) multiplying a dividend by the reciprocal of the divisor to generate a quotient.

9. The method of claim 8 wherein at least one of the first and second lookup tables is stored in a nonvolatile memory.

10. The method of claim 9 wherein the nonvolatile memory comprises read only memory.

11. The method of claim 9 wherein the nonvolatile memory comprises logic gates.

12. The method of claim 8 wherein the step of generating the reciprocal further comprises the step of adding the estimated reciprocal term and the error term.

13. The method of claim 8 wherein entries of the first lookup table are determined by the steps of:

1) computing an actual reciprocal for each operand value that shares a same first lookup table entry;
2) computing the first lookup table entry such that the first lookup table entry is less than or equal to all of the actual reciprocals; and
3) repeating steps 1) and 2) for each first lookup table entry.

14. The method of claim 8 wherein entries of the second lookup table are determined by the steps of:
1) computing an actual reciprocal for each operand value that shares a same second lookup table entry;
2) computing the second lookup table entry such that the second lookup table entry plus the estimated reciprocal term for any operand value sharing the same second lookup table entry is less than or equal to the actual reciprocal of that operand value; and
3) repeating steps 1) and 2) for each second lookup table entry.

15. An apparatus for computing a reciprocal of an operand comprising:
a first memory containing estimated reciprocal terms;
a second memory containing reciprocal error terms;
an adder for adding a selected estimated reciprocal term from the first memory and a selected reciprocal error term from the second memory to provide the reciprocal, wherein the selected estimated reciprocal term corresponds to at least a first portion of the operand, wherein the selected reciprocal error term corresponds to at least a second portion of the operand.

16. The apparatus of claim 15 wherein at least one of the first and second computer memories is a nonvolatile memory.

17. The apparatus of claim 16 wherein the nonvolatile memory comprises read only memory.

18. The apparatus of claim 16 wherein the nonvolatile memory comprises logic gates.

19. The apparatus of claim 15, wherein the estimated reciprocal terms form a first lookup table, wherein entries of the first lookup table are determined by the steps of:
1) computing an actual reciprocal for each input operand value that shares a same first lookup table entry;
2) computing the first lookup table entry such that the first lookup table entry is less than or equal to all of the actual reciprocals; and
3) repeating steps 1) and 2) for each first lookup table entry.

20. The apparatus of claim 15, wherein the reciprocal error terms form a second lookup table, wherein entries of the second lookup table are determined by the steps of:
1) computing an actual reciprocal for each operand value that shares a same second lookup table entry;
2) computing the second lookup table entry such that the second lookup table entry plus the estimated reciprocal term for any operand value sharing the same second lookup table entry is less than or equal to the actual reciprocal of that operand value; and
3) repeating steps 1) and 2) for each second lookup table entry.

21. An apparatus for performing a divide operation, comprising:
a first memory containing estimated reciprocal terms;
a second memory containing reciprocal error terms;
an adder for adding a selected estimated reciprocal term from the first memory and a selected reciprocal error term from the second memory to provide the reciprocal, wherein the selected estimated reciprocal term corresponds to at least a first portion of a given divisor, wherein the selected reciprocal error term corresponds to at least a second portion of the divisor; and
a multiplier for multiplying a dividend by the reciprocal to generate a quotient.

22. The apparatus of claim 21 wherein at least one of the first and second computer memories is a nonvolatile memory.

23. The apparatus of claim 22 wherein the nonvolatile memory is a read only memory.

24. The apparatus of claim 22 wherein the nonvolatile memory comprises logic gates.

25. The apparatus of claim 21, wherein the estimated reciprocals form a first lookup table, wherein entries of the first lookup table are determined by the steps of:
1) computing an actual reciprocal for each input operand value that shares a same first lookup table entry;
2) computing the first lookup table entry such that the first lookup table entry is less than or equal to all of the actual reciprocals; and
3) repeating steps 1) and 2) for each first lookup table entry.

26. The apparatus of claim 21, wherein the reciprocal error terms form a second lookup table, wherein entries of the second lookup table are determined by the steps of:
1) computing an actual reciprocal for each operand value that shares a same second lookup table entry;
2) computing the second lookup table entry such that the second lookup table entry plus the estimated reciprocal term for any operand value sharing the same second lookup table entry is less than or equal to the actual reciprocal of that operand value; and
3) repeating steps 1) and 2) for each second lookup table entry.

* * * * *